United States Patent [19]

Norbäck

[11] Patent Number: 4,529,420
[45] Date of Patent: Jul. 16, 1985

[54] METHOD FOR DRYING GAS AND DEVICE FOR THE IMPLEMENTATION THEREOF

[75] Inventor: Per Norbäck, Lidingö, Sweden
[73] Assignee: AB Carl Munters, Sollentuna, Sweden
[21] Appl. No.: 452,619
[22] Filed: Dec. 23, 1982

[30] Foreign Application Priority Data

Dec. 30, 1981 [SE] Sweden ................................ 8107882

[51] Int. Cl.³ .............................................. B01D 53/06
[52] U.S. Cl. ........................................ 55/181; 55/208; 55/390
[58] Field of Search ...................... 55/34, 60, 78, 181, 55/208, 385 R, 390

[56] References Cited

U.S. PATENT DOCUMENTS

| | | | |
|---|---|---|---|
| 2,993,563 | 7/1961 | Munters et al. | 55/62 X |
| 3,470,708 | 10/1969 | Weil et al. | 55/34 X |
| 3,774,374 | 11/1973 | Dufour et al. | 55/34 X |
| 3,828,528 | 8/1974 | Weil | 55/390 X |
| 4,012,206 | 3/1977 | Macriss et al. | 55/62 X |
| 4,021,194 | 5/1977 | Weislehner | 55/385 R X |
| 4,134,743 | 1/1979 | Macriss et al. | 55/34 |
| 4,409,006 | 10/1983 | Mattia | 55/60 X |

FOREIGN PATENT DOCUMENTS 2729345  1/1978  Fed. Rep. of Germany ........ 55/208

Primary Examiner—Robert H. Spitzer
Attorney, Agent, or Firm—Curtis, Morris & Safford

[57] ABSTRACT

A method and device for the drying of gas whereof a main flow (14) is passed through a drying zone of a regenerative moisture exchanger having a body (10) containing a bed of absorbent material. The bed is regenerated in a regenerating zone (26b, 26c) wherein a regenerant gas (18), heated outside said body, is passed through the bed counter-current to the main flow (14). After passing through the bed of the moisture exchanger (10) the regenerant gas is recirculated, without passing back through the bed, and is caused, after further heating (34) to pass through the bed via at least one further regenerating zone (26a, 26b).

2 Claims, 1 Drawing Figure

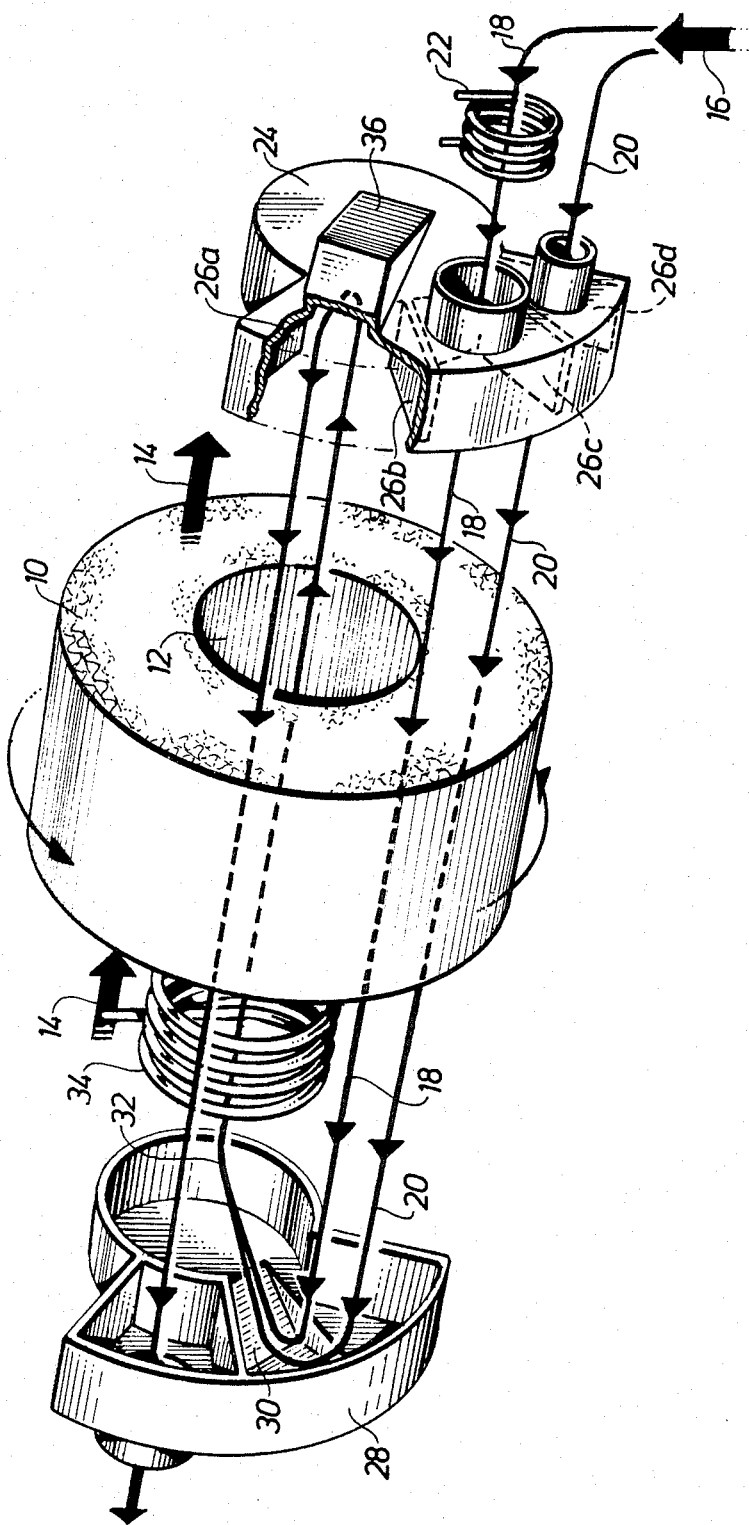

METHOD FOR DRYING GAS AND DEVICE FOR THE IMPLEMENTATION THEREOF

The present invention is concerned with a method for drying gas whereof a main flow is passed through a drying zone of a regenerative moisture exchanger equipped with a bed of moisture-absorbing substance, which bed is brought in contact, after the drying zone, with a regenerating zone wherein a regenerant gas is passed through the bed countercurrent to the main flow. The invention is further concerned with a device for the implementation of said method.

Regeneration is effected in moisture exchangers of this type by a regenerant gas, which is heated to enhance its capacity to take up moisture. In stationary moisture exchangers using at least two beds, one of which is regenerated while the other is in the drying phase, the bed itself is usually equipped with heaters. The drying capacity of the regenerant gas as it passes through different sections of the bed is thus affected on each pass through the heating thereof by the built-in heaters.

The situation is different in moisture exchangers of the type in which the bed consists of a rotor structure whereof the filling is brought into contact with the drying zone and the regeneration zone by the continuous rotation of the rotor. Such moisture exchangers cannot, or can only with difficulty, be fitted with built-in heaters and hence the regenerant gas must be preheated before entering the rotor bed. Another problem is that a portion of the regenerating heat is stored in the rotor bed during regeneration, is carried by the rotor into the drying zone, and is given off there. That part of the regenerating heat which is thus consumed otherwise than for the evaporation of water in the rotor represents a sheer loss, and this loss is the greater the higher the regenerating temperature is. Hence in moisture exchangers of the type comprising a bed or filling in the form of a rotor, it does not pay to heat the regenerant air to too high a temperature. Instead the volume of regenerant gas must be increased, with the drawbacks this entails. Alternatively, as is often done in practice, one may carry off part of the heat stored in the rotor before it enters the drying zone by providing, between the regenerating zone and the drying zone, a cooling zone wherein the rotor is cooled by a small airflow. The primary purpose of this is usually to ensure that the rotor is cooled so as not to warm the drying air unnecessarily. The heat taken up by the cooling air may be recovered by mixing it with the regenerant air, but this requires special arrangements in the form of an extra fan or some form of reducing device, which at once makes the device complicated and expensive.

The main object of the main invention is therefore to provide a method and a device for the drying of gas wherein the regenerant air is caused to take up a greater quantity of moisture per unit weight than in conventional moisture exchangers of this type. Another object is to achieve cooling of the rotor bed before it enters the drying zone on leaving the regenerating zone, without the necessity to provide special arrangements such as fans or reducing means in the exchanger.

These and other objects or purposes of the invention are achieved by a method and device having the characteristics set forth in the Claims hereafter.

The invention will be more particularly described in the following paragraphs, reference being made to the drawing, which illustrates a preferred embodiment of a device for the implementation of the method. The FIGURE is a schematic exploded diagram, in perspective, of the essential components of the dryer or moisture exchanger for effecting the drying process according to the invention.

In the following account, the dryer will be described in connection with the drying of humid air, and it will be assumed that the regenerant gas, too, is air, although the invention is not, of course, restricted thereto.

The FIGURE shows only the essential parts of the device, such components as the housing and the fans that generate the airflows being omitted for the sake of clarity. Thus the dryer comprises a regenerative drying rotor, designated 10, containing a bed which may consist, for example, of alternately plane and corrugated thin sheets of a suitable material, such as a metal, e.g. aluminium, glass fibre, or similar. The material has in itself the capacity to take up moisture and/or is impregnated with a hygroscopic substance, such as lithium chloride, or a solid sorbent, such as molecular sieves or similar. The alternating plane and corrugated sheets are wound spirally upon each other to form the rotor body 10, which thus contains a large number of axial ducts which are open at the two end faces of the rotor. In the embodiment illustrated the rotor is formed with a hollow central hub or cylindrical shaft 12 for a purpose to be described below. The rotor 10 is rotatably mounted in the housing (not shown), as by rollers supporting the outer circumference thereof, and is driven at a slow speed in the direction of rotation indicated by the arrows by means, for example, of a motor-powered endless belt passing round the circumference thereof.

The airflow to be dried, referred to as the main airflow, passes through the rotor 10 from left to right in the FIGURE, as indicated by the arrows 14. The air 14 is caused to pass through the drying zone of the rotor 10 by, for example, fan means (not shown). After the drying zone, in the direction of rotation of the rotor 10, there is provided a regeneration zone wherein the moisture taken up by the rotor 10 is removed by means of preheated regenerant air.

According to the invention, the regenerating and cooling zones are constructed as follows: the airflow entering at arrow 16 is divided into two streams 18, 20, whereof one stream 18, which having been preheated by a heater 22 serves as regenerant gas, passes through the rotor 10, while the other stream 20, which serves as cooling gas, passes unheated through the rotor 10 after the heated streams 18, seen in the direction of rotation.

The rotor 10 is divided into a regenerating zone, a cooling zone and a drying zone by means of an end cap 24 provided with partitions 26a–26d, in the manner well-known to the art.

The stream 20 used as cooling air, which cools the bed of the rotor before said bed enters the drying zone, is heated during its passage through the rotor 10 and the air thus heated is reunited with the regenerant airflow 18 after the passage thereof through the rotor. The streams 18, 20 thereupon mix to form a single airflow 32 in a duct 30 in an end cap 28 on the left-hand side of the rotor 10 in the FIGURE. The duct 30 then turns this airflow and conducts it back through the hub or shaft 12 of the rotor 10. The recirculated flow 32 entering the rotor shaft 12 is heated by a heater 34, shown schematically as a heat coil, which is preferably located inside the hollow shaft 12. The airflow 32 thus heated is turned at the right-hand end face of the rotor 10 in the FIG- URE by means of a duct 36 formed in the cap 24 and is caused to pass through the rotor 10 via another regenerating zone bounded by partitions 26a and 26b of the cap 24. This second regenerating zone is located, looking in the direction of rotation of the rotor 10, ahead of the first regenerating zone, which is bounded by partitions 26b and 26d of the end cap 24.

The purpose of having the regenerating airflow pass through the rotor a plurality of times, such as the two times—airflows 18 and 32 of the example—is to cause it to take up a greater quantity of moisture per kilogram than in a conventional dryer, where the regenerating air passes through the rotor once only.

If we assume for the sake of an example that we wish to dry air at the conditions 0° C. and 50% relative humidity and that the regenerant air is at the same conditions, using a conventional (one-step) regeneration method we may heat the regenerant air to say 70° C. Theoretically this regenerant air could then reach an output condition of 34° C. and 50% relative humidity, with its moisture content increasing from approx. 2 g/kg to 17 g/kg.

If instead we halve the regenerant air volume but supply the same amount of heat divided equally between two consecutive steps, the first step will essentially correspond to the conventional drying process above described. Then this air, being at a temperature of 34° C. as above, is again heated 70° C. to 104° C. and passed through the rotor, leaving it this time at a temperature of 51° C. and with a moisture content of 41 g/kg. In the second drying step the regenerant air takes up 41−17=24 g, and hence altogether the regenerant air takes up 41−2==39 g/kg instead of 15 g as in the conventional case. Thus the regenerant air takes up more than 2×15 g/kg, and the dryer therefore has greater capacity, or better economy, in the system with a plurality of consecutive regeneration steps.

In the case of one-step regeneration one might consider, in theory, heating a regenerant airflow of half the volume to 140° C. in a single step. However, this would entail serious losses due to the portion of the regenerating heat that is stored in the rotor bed on regeneration and which passes with the rotor into the drying zone to be carried away here. Due to these losses it does not pay to heat a reduced regenerant airflow to the temperature of 140° C. considered in this example.

In two-step regeneration according to the invention, on the other hand, the temperature is kept at a lower level, 70° C. in the first step and 104° C. in the second. On the whole, therefore, the rotor temperature and hence the amount of heat lost to the drying air are considerably lower than in the 140° C. case, so that we still achieve an enhancement of capacity or an improvement in economy over the conventional regeneration method, with the temperature of 70° C. considered in the example.

Two-step or multistep regeneration (see above) also affords major advantages inasmuch as the cooling air 20 can be impelled by the same fan and without any extra pressure drop through the rotor in parallel with the air 18 of the first regeneration step, to be thereafter mixed with the latter to form airflow 32 and heated further ahead of the second regeneration step. In this manner the heat given up by the rotor in the cooling zone is recovered and used for the benefit of the regeneration process without the necessity for extra fans, reducing means, or similar arrangements to convey the cooling air back to the regenerating zone as in conventional dryers with one-step regeneration.

The invention is naturally not restricted to the embodiment illustrated but may be varied within the scope of the idea underlying it. Thus the recirculation of air to the second regeneration step may pass outside the rotor instead of via its hub 12, but the design shown provides a compact construction and secures the shortest flow paths.

I claim:

1. A self-contained moisture exchanger, comprising a moisture exchanger body in the form of a continuously rotating rotor (10) containing an absorbent bed containing ducts whereby gas is conducted between two end faces (24, 28) of the rotor, and partition means (26a–26d, 30) which divide the said faces into sector-shaped drying and regenerating zones, the gas (14) to be dried being conducted through the drying zone and preheated regenerant gas (18) through the regenerating zone; characterized by the provision of a system of ducts (30, 26a, 26d) disposed entirely within the moisture exchanger for recirculating the regenerant gas (18), after the first pass thereof through the rotor 10, without passing back through the bed, and to reconduct the regenerant gas through the rotor via at least one additional regenerating zone (26a, 26b), heating means (34) being provided to heat the regenerant gas before its re-entry into the rotor (10), wherein the regenerant gas is recirculated internally between the two end faces thereby requiring no external ducts to carry the regenerant gas, the rotor (10) further including a hollow hub (12) through which the regenerant gas is recirculated before its entry into the additional regenerating zone (26a, 26b).

2. Device according to claim 1, characterized by the provision of partition means (26c, 26d) to provide a cooling zone wherein a cooling gas (20) is conducted through the rotor (10) ahead of the drying zone in the direction of rotation thereof, and of duct means (30) to mix the cooling gas (20) and the regenerant gas (18) from the first-mentioned regenerating zone.

* * * * *